United States Patent [19]

Vlahos et al.

[11] Patent Number: 4,589,013

[45] Date of Patent: May 13, 1986

[54] AUTOMATED ENCODED SIGNAL COLOR IMAGE COMPOSITING

[75] Inventors: Paul E. Vlahos, Canoga Park; Petro Vlahos, Redway; David F. Fellinger, Westlake Village, all of Calif.

[73] Assignee: 501 Ultimatte Corporation, Reseda, Calif.

[21] Appl. No.: 520,067

[22] PCT Filed: Jun. 13, 1983

[86] PCT No.: PCT/US83/00933

§ 371 Date: Jun. 13, 1983

§ 102(e) Date: Jun. 13, 1983

[87] PCT Pub. No.: WO84/05007

PCT Pub. Date: Dec., 1984

[51] Int. Cl.[4] .................... H04N 5/22; H04N 9/535
[52] U.S. Cl. .................................................. 358/22
[58] Field of Search ................ 358/22, 40, 81, 82, 358/183

[56] References Cited

U.S. PATENT DOCUMENTS

| | | | |
|---|---|---|---|
| 3,560,638 | 2/1971 | Skrydstrup | 358/22 |
| 3,595,987 | 7/1971 | Vlahos | 358/22 |
| 3,778,542 | 12/1973 | Hanseman | 358/22 |
| 4,007,487 | 2/1977 | Vlahos | 358/22 |
| 4,100,569 | 7/1978 | Vlahos | 358/22 |
| 4,344,085 | 8/1982 | Vlahos | 358/40 |
| 4,409,611 | 10/1983 | Vlahos | 358/22 |

FOREIGN PATENT DOCUMENTS

| | | | |
|---|---|---|---|
| 2044036 | 10/1980 | United Kingdom | 358/22 |
| 2059219 | 3/1981 | United Kingdom | 358/22 |

OTHER PUBLICATIONS

High Quality Montage Pictures by a New Color Killer Soft Chromakey System, by Nakamura et al. SMPTE Journal, Feb. 1981, vol. 90, pp. 107-112.

Primary Examiner—Tommy P. Chin

Attorney, Agent, or Firm—Blakely, Sokoloff, Taylor & Zafman

[57] ABSTRACT

A method and apparatus to cause a colored backing to be replaced by a background scene, such that the composite scene shows no loss of detail, no edge anomalies, no evidence of a colored backing having been present, and no evidence that the final scene is a composite, even when the foreground scene contains fine strands of hair, glassware, smoke, fog, or other semitransparent subjects. Control signals $E_b$ and $E_c$ are created to cause the foreground and background scenes to mutually interact in a natural manner, so that shadows on the colored backing appear as shadows on the background scene, and the luminance of the background selectively causes back and edge lighting of foreground subjects. The hue and luminance of the colored backing are continuously and automatically tracked and removed by a subtraction process. The background level is automatically held constant even though backing illumination changes. Hue and luminance removal and background level are controlled by comparators (35,36) and digital counters (39,40). Levels set by the automatic circuits are retained when the camera pans off of the (blue) backing. No disturbance occurs to the picture when the camera returns to the backing. Digital memories have manual override (64), allowing the creation of night scenes and other special effects. Chroma and luminance removal are performed by a subtraction process on the encoded video signals in both the NTSC and PAL systems. Chroma removal in the PAL system is accomplished by independently tracking (115, 116) the chroma of each line, and is not affected by PAL quadrature errors. The blue cast on foregound subjects caused by lens flare and secondary illumination of the subject by the blue backing is removed from the composite image. Such discoloration of the subject may also be removed (121, 122) from the subject in the foreground scene when it is not being composited.

40 Claims, 4 Drawing Figures

AUTOMATED ENCODED SIGNAL COLOR IMAGE COMPOSITING

TECHNICAL FIELD

Electronic combination of separate foreground and background scenes into a composite whole picture.

BACKGROUND ART

The earliest video compositing devices to be put into service are generally known as "chroma-key" and were described by Kennedy and Gaskin of the National Broadcasting Company in the Dec. 1959 issue of the "Journal of the Society of Motion Picture & Television Engineers", pgs. 804 to 812.

The basic principle of all chroma-key devices is to develop a keying or switching signal based on the presence or absence of a backing color such as blue. The key signal is used to switch video from the background scene to the foreground scene when the foreground camera scanning beam leaves the blue backing and enters the subject area, and vice versa.

Recently, Nakamura et al modified the chroma-key system to a "soft edge chroma-key", in which the edges between the foreground and the background are purposely blurred. This tends to hide the hard edge effects of switching between the foreground and the background. However, detail is lost in the boundary area, and since individual strands of hair represent such a boundary area, they are not reproduced. Nakamura also added a subtraction circuit to eliminate the blue at the soft edge. The system is disclosed in the SMPTE Journal, Vol 90, No. 2, Feb. 1981, page 107.

Another recent modification of the chroma-key system is described by Mason of the British Broadcasting Corporation in UK patent No. 2,044,036, published Oct. 8, 1980. It also removes the blue tint in the soft edge of the switching region.

All chroma-key (i.e., switching devices) including the Nakamura and Mason soft edge devices suffer from a number of defects, among which are the loss of fine detail, such as hair, netting, lace, etc., and the inability to faithfully reproduce a full linear range of semi-transparent subjects.

The scanning beam in a switching system must be part way into the subject in order to develop sufficient information to determine that a switch action should occur. That portion of the subject covered by the scanning beam prior to switching is forever lost. No chroma-key device can therefore reproduce the foreground subject without loss of edge detail. This is why such devices cannot reproduce individual strands of hair.

A switching device cannot adequately reproduce a semi-transparent subject, since a switch is an "OR" device. That is, it shows either the foreground 'or' the background scene through it. The visibility of the background scene should be reduced in luminance in proportion to the opacity of the foreground subject.

To accomplish this 'and' combining of the foreground and background scenes it is necessary to keep the foreground video channels open at all times and at full level, so as to show all levels of the foreground subject transparency down to the smallest wisp of fog or clear glass. However, if the foreground channels are open the blue backing must be removed by suppression, not by switching. Further, the control of the background level must be linear; that is, proportional to the brightness and visibility of the colored backing. Proportional control of the background level not only results in realistic reproduction of transparent objects, it also causes retention and transfer of shadows from the backing to the background scene.

A non-switching compositing system, having the foreground channels always 'on', will retain the limiting resolution of the camera, and no detail will be lost.

The P. Vlahos U.S. Pat. No. 3,595,987 was filed Feb. 20, 1969. It introduced the concept of developing a control signal proportional to the brightness and visibility of the colored backing, of controlling the level of the background scene as a linear function of the amplitude of the control signal, and of eliminating the blue backing by limiting that video signal amplitude to a maximum that is represented by the instantaneous amplitude of one of the other primary colors. This limiting action also eliminated lens flare and discoloration of foreground subjects by secondary illumination from the colored backing when blue is limited to green. This patent issued July 27, 1971.

The technology of the patent requires a relatively pure backing color and does not disclose removal of the contaminating color when using a backing of low color purity; nor does it explicitly define the mixing as additive or non-additive.

The P. Vlahos U.S. Pat. No. 4,007,407, issued Feb. 8, 1977, introduces a blue clamp, in which blue (B) may exceed green (G) to the extent that green exceeds red (R); i.e., $B = G + (G-R)^+$. The term $G-R$ permits reproduction of blue eyes and pastel blue colors while simultaneously eliminating lens flare and subject color contamination from secondary illumination from the backing. A color ratio is established to distinguish the colored backing from the subject when the backing illumination is non-uniform.

This patent also discloses the complete removal of R G B contaminating colors in the colored backing by subtraction of a bias voltage, and also the use of additive mixing of foreground plus background signals to form the composite. It discloses a background and bias control signal as $E = B - G$.

This patent was limited in that the system could not reproduce magenta colors, nor did it possess a capability of modifying shadow density.

The P. Vlahos U.S Pat. No. 4,100,569, issued July 11, 1978, introduced the third term in the blue limit equation; i.e., $B = G + K_1(G-R)^+ + K_2(R-G)^+$, which permits the full reproduction of magenta, thus removing all restrictions as to the range of hues reproduced. This patent also discloses a bias and control signal of the general form:

$$E_c = K_1[B - K_2(K_r R \text{ OR } K_g G) + (1-K_2)(K_r R \text{ AND } K_g G) - K_3(1-B)]^+$$

The significance of this equation is that the second term permits the reproduction and compositing of cyan and magenta in the same scene. The third term permits the use of colored backings such as cyan or yellow. The schematic circuit shows foreground and background signals to be combined by additive mixing by using an operational amplifier.

The P. Vlahos U.S. Pat. No. 4,344,085, issued Aug. 10, 1982, discloses a fourth term in the $E_c$ equation of the form $-K(1-E_c)$, which serves to prevent a partial turn-on of the background in black glossy areas that reflect the blue backing. It further discloses the use of a partially non-linear control voltage for the purpose of cleaning up (removing) unwanted footprints from a blue floor, and for removing unwanted detail, such as visible seams and joints in the backing. It also discloses a glare/noise circuit to reduce electrical "noise" in shadows, and to eliminate floor glare on back-lighted subjects. Also disclosed is an advanced shadow control that permits shadows to be lightened or darkened. It also introduced compositing against a black backing or a white backing.

The patent does not disclose the removal of color contamination by subtraction of a vector from the vector representing the R G B components in an encoded signal.

The P. Vlahos U.S. Pat. application Ser. No. 06/305,073, filed Sept. 24, 1981, now U.S. Pat. No. 4,409,611, issued Oct. 11, 1983, discloses the removal of backing colors by a subtraction process in which the R G B components of the backing are expressed by a generated vector, which vector is subtracted from the subcarrier representing the R G B components of the foreground scene. The subtraction vector is under the control of $E_b$, which has the form of:

$$E_b = k[(B-G)^+ - K_1(G-R)^+ - K_2(R-G)^+]^+$$

It also discloses an always open foreground channel and combining the foreground and background scenes by additive and non-additive mixing. The chroma of the backing as well as chroma contamination of the foreground subject is removed. Luminance of the backing is removed, but luminance cast upon the subject by the backing may be retained in whole or in part and may be controlled by the average luminance of the background scene.

Also disclosed is a modified background control signal of the form:

$$E_c = K_1[B - K_2(K_rR \text{ OR } K_gG) + (1-K_2)(K_rR \text{ AND } K_gG) - K_3(1-B)]^+$$

Matching chroma vector phase and amplitude and luminance level is accomplished by manual adjustments by the operator. Only the selection of the $E_b/E_c$ ratio for control of chroma removal is disclosed as automated.

DISCLOSURE OF INVENTION

The present invention is an improved linear non-switching compositing system that operates upon the encoded video signal. The improvements consists of automatic circuits using digital memory for accomplishing all routine adjustments without need of human intervention. The automatic circuits are in continuous operation and function over a wide range of backing hue and illumination levels. The automatic identification and tracking of the backing hue and luminance, as well as automatic control of the background level is especially important in a live television broadcast environment, such as a newscast.

A local oscillator is phase-locked to the foreground video color burst. The foreground video is sampled in the backing area in those regions free of foreground subject matter and receiving full illumination. Such areas are present when $E_c'$ exceeds a reference level. This video sample will show the backing color as a specific phase-angle of a subcarrier representing the R G B components of the foreground scene. The phase of the subcarrier is compared to the phase of the local oscillator and any difference initiates digital counters to delay (phase-shift) the generated signal until the two signals are phase matched. The amplitude of the generated signal is then compared with the amplitude of the foreground video subcarrier and a second digital counter is activated to insert or remove a resistive network as needed to match the levels. The generated signal, thus exactly matching the phase and amplitude of the subcarrier representing the colored backing is then subtracted from the foreground video signal to remove the backing chroma.

In a somewhat similar manner and utilizing a comparator and digital counter, the luminance of the backing is removed by subtracting a signal of matching level.

The background scene level is also controlled and held to a designated level, usually unity, by means of a comparator, digital counter and resistive ladder network. All counters are automatically inhibited from receiving new data, and thus hold in memory the values already determined by the comparators, when the foreground camera pans off of the backing. The camera may thus return to the backing without even a momentary disturbance to the composite image.

The memory circuits may be manually locked, by opening the actuating clock circuit, to create special effects.

Two control signals $E_b$ and $E_c$ are generated from the R G B video signals that represent the color components of the foreground scene. Both signals are modified from the P. Vlahos U.S. patents previously mentioned herein. The present form of $E_b$, the first control signal, is:

$$E_b = K[(K_3B - G) - K_1(G-R) \text{ OR } K_2(R-G)]^+$$

The present form of $E_c$, the second control signal, is:

$$E_c = B - K_1(G \text{ OR } R) - K_2(K_3E - B)$$

Control signal $E_b$ responds to backing chroma and also to chroma contamination of foreground subjects by secondary illumination from the colored backing or from lens flare. When used for chroma removal, $E_b$ removes the chroma of the backing and also chroma contamination of the subject.

Removal of color contamination of the subject is normally employed when the foreground and background images are composited. However, in the direct foreground camera view showing a newscaster, for example, in front of a blue backing, lens flare and secondary illumination are present and discolor the foreground subject. This may be eliminated as in the composite scene by using $E_c$ to inhibit $E_b$ in the backing area.

Either $E_c$ or $E_b$ may be used in the subtraction circuit that removes luminance from the backing. When $E_c$ is employed, the backing luminance as cast upon the subject as edge and back lighting is not removed from the subject. Using $E_b$ as the luminance control signal removes the luminance cast upon the subject by the backing. The choice, or proportioning of $E_b/E_c$ may be determined automatically as a function of the average brightness of the background scene; or the two signals may be proportioned manually.

The foreground video signal source may be a video camera that normally delivers red, green and blue (R G B) signals as well as an encoded video signal. The encoding may be either the United States NTSC or the European PAL system.

When the R G B separate video signals are not available, these may be obtained by decoding the encoded video signal. This is commonly done when the foreground scene was recorded on video tape.

A film scanner is the equivalent of a video camera, since it scans a film of the original scene. Video discs or other video storage devices may be used as the source of foreground video signals provided that R G B signals can be derived from the signal from the source.

BEST MODE FOR CARRYING OUT THE INVENTION

Equation $E_b$

Figure 1:
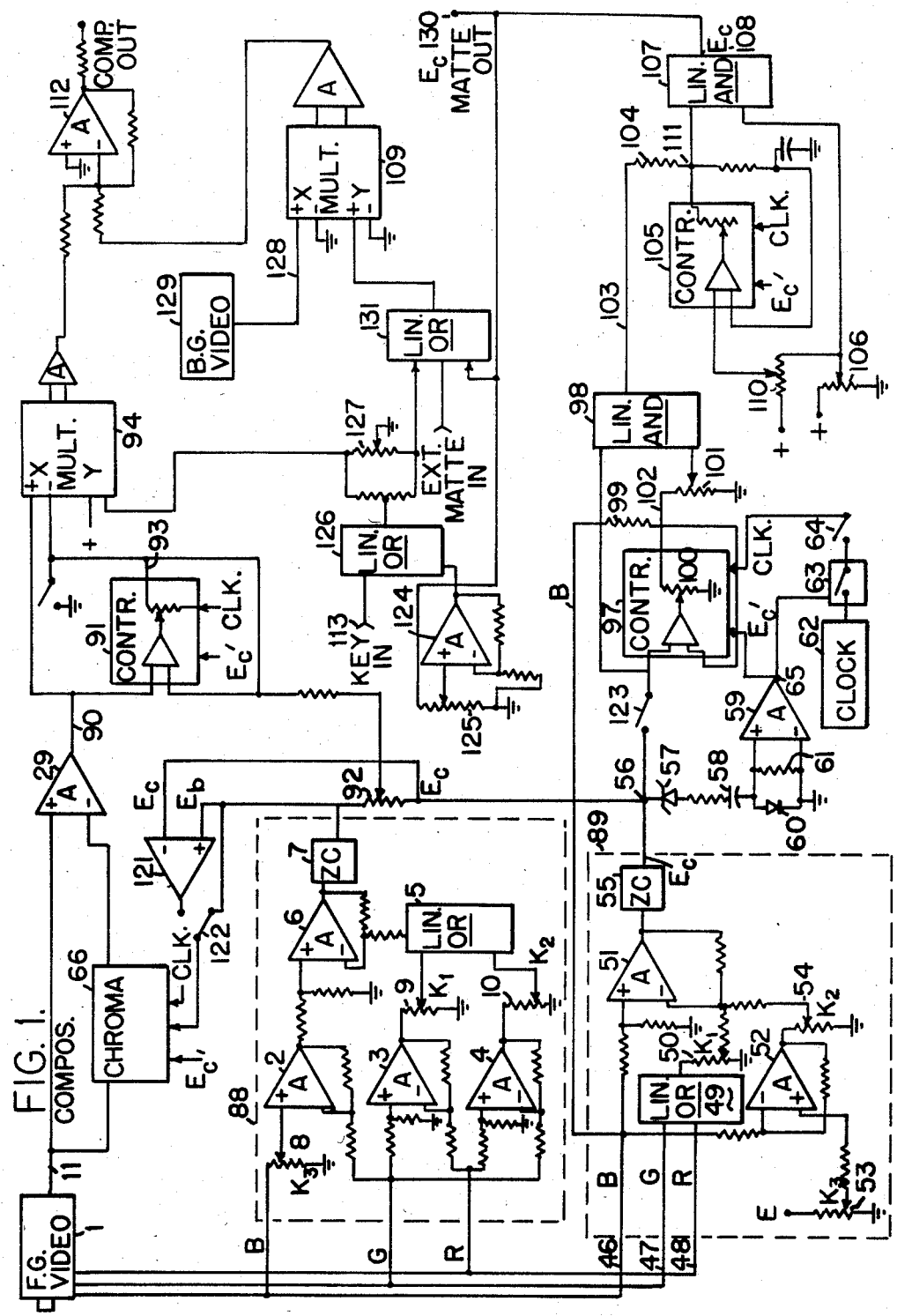
FIG. 1 is the schematic diagram of the whole invention.

Referring to FIG. 1, the R G B signals from the foreground camera or other video source 1, are connected through resistors to amplifiers 2, 3 and 4; which may be Harris HA2525 operational amplifiers. Since blue and green are connected to amplifier 2, the output thereof will be $(K_3B-G)$. Amplifier 3 will provide $K_1(G-R)$, while amplifier 4 will provide $K_2(R-G)$. The outputs from potentiometers 9 ($K_1$) and 10 ($K_2$) are connected to linear OR gate 5, the output of which will be the larger of the two inputs. Amplifier 6 subtracts the output of OR gate 5 from the $K_3B-G$ term provided by amplifier 2. Zero clip 7 permits only positive values from the output. Taken together, these components provide for a first control signal $E_b$, which is utilized for removing unwanted chroma from the foreground scene. The equation for $E_b$ is:

$$E_b = (K_3B-G) - K_1(G-R) \text{ OR } K_2(R-G)^+ \qquad \text{Eq. 1}$$

The + symbol indicates that $E_b$ shall have only positive polarity values. The OR symbol indicates the larger of the two terms. When $E_b$ is zero the foreground scene is unaffected. The amount of chroma to be removed from the foreground scene is proportional to the value of $E_b$, thus it is used to remove backing chroma. It is also capable of removing the blue discoloration of foreground subjects caused by blue illumination of the subject by light reflected from the backing, and from an overall blue cast to the image caused by lens flare. This discoloration of the subject is removed while retaining the blue of blue eyes and of other pastel blue subjects.

A white subject, by definition, will have equal B G R values, such as 0.8 for each. When flooded with blue light from the backing the B value will typically increase from 0.8 to 0.9. Assuming that $K_3=1$, the $K_3B-G$ term will then be 0.1, while the $G-R$ and $R-G$ terms are zero. Thus, $E_b=0.1$ and this is the amount of blue chroma removed, returning the B G R values to 0.8 for each, which is neutral white.

Blue eyes and pastel blues are by Nature provided with a color distribution of, for example, $B=0.8$, $G=0.7$ and $R=0.6$. Notice the 8, 7, 6 straight-line relationship. Assuming $K_3=1$, the first term in equation 1 will be +0.1. The second term will also be +0.1. The third term is −0.1, but since it is less than the second term it is ignored by OR gate 5. The resulting $E_b$ at elements 6 and 7 is zero. Therefore, no blue is removed from blue eyes. This is, of course, a distinct advantage of the method and apparatus of this invention.

White Balance

There are at least two conditions for which it is desirable to deviate from neutral white. One is when a white subject in the foreground scene is either a cooler or a warmer white than a white subject in the background scene. The white balance of the foreground scene can be adjusted by white balance control 8, which is $K_3$, to match the white of the background scene. This control can be adjusted to slightly reduce the amplitude of the blue video signal, or to increase it by about 20%, or more, into amplifier 2. As $K_3B$ is increased, $E_b$, the blue removal signal, is increased, less blue is present, and the foreground subject becomes warmer.

This control of white balance is especially desirable when a person has generous amounts of yellow-blonde hair. The bright blue backing showing through the thinner parts of the hair tends to turn the hair to a cool white. Adjustment of the white balance control permits a white balance that retains the warm color of yellow-blonde hair.

In the event that a magenta color occurs in the foreground scene the term $B-G$ has a positive value. However, the term $R-G$ is also positive and acts to cancel the $B-G$ term. This permits the reproduction of magenta. The OR gate 5 permits the use of blue and magenta in the same scene by automatically selecting the appropriate term. Potentiometer 9, $K_1$, is normally retained in the "open", or full on, position. Potentiometer 10, $K_2$, is normally retained in the "closed", or full off, position, to prevent human flesh tones from assuming a purple tint due to blue illumination from the backing. When it is necessary to reproduce magenta, $K_2$ is opened only so far as is necessary to achieve a subjectively satisfying magenta.

The description of this invention utilizes blue as the backing color. Green or red backings may alternately be used. The R G B input cables 46, 47 and 48 of FIG. 1 are interchanged as follows.

When using a green backing the blue and green inputs are interchanged. With $K_2$ closed, yellow reproduces as red. $K_2$ must be at least partly opened to achieve a subjectively satisfying yellow. With $K_2$ closed all green flare and subject discoloration is eliminated.

When using a red backing the red and blue inputs are interchanged. Potentiometer $K_2$ must be open to properly reproduce magenta. With $K_2$ fully closed, all red flare and subject discoloration is eliminated. However, magenta is reproduced as red.

In the equations, the letters B, G and R represent blue, green and red only when the backing is blue. In all other cases, B represents the dominant color of the backing, G the next lower primary, and R represents the primary color having the lowest content in the backing.

The term $E_b$ is directly proportional to the visibility and brightness of the colored backing and to the secondary illumination of the subject by the backing. It therefore removes all chroma evidence that a colored backing was employed in the foreground scene. When there are linearity differences between the R G B color components of the scene, or if $E_b$ is made non-linear with respect to R G B, it is possible to create unusual color effects in shadows and in the background scene itself.

Chroma Removal

In a previous Vlahos patent application, now U.S. Pat. No. 4,409,611, the chroma of the backing was removed by subtracting a subcarrier signal having a phase and amplitude that was matched to that of the foreground video subcarrier by a tedious series of successive manual adjustments to the phase and level controls.

Manual adjustments were satisfactory as long as there were no changes in the lighting level, camera lens iris adjustment, camera controls or drift in the camera circuits. Any change in these parameters required readjustment of the chroma subtraction controls.

In the present invention the chroma of the backing is automatically acquired and removed. The automatic circuits continuously track the backing chroma and level. The backing chroma is removed regardless of changes in lighting or camera adjustment. This is a great improvement over prior embodiments of compositing devices.

Figure 2:
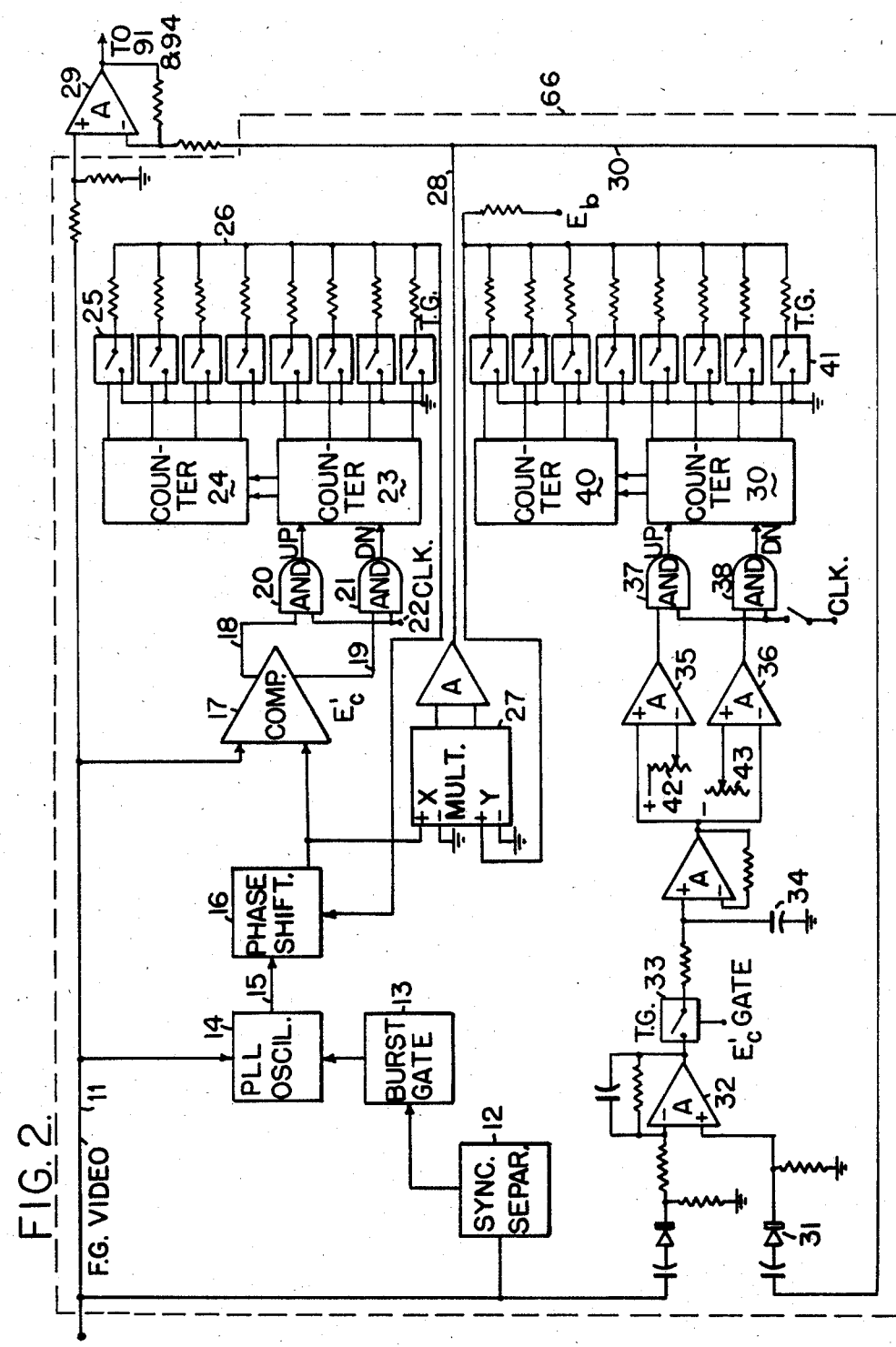
FIG. 2 is the schematic diagram of the chroma circuit 66 of FIG. 1.

Referring to FIG. 2, the composite foreground video signal at 11 is used as an input to separate synchronization (sync) and blanking pulses in separator 12. The sync pulse is used to generate a burst-gate 13. This gates phase-lock loop (PLL) oscillator 14 to the chroma burst of the foreground video signal 11.

Output 15 of the PLL oscillator is connected to operational amplifier 16 that is connected as a delay phase shifter. This is to permit 360° phase rotation of the oscillator waveform with respect to burst phase.

The output of phase-shifter 16 is connected to phase comparator 17, as is also the foreground video signal at 11. The comparator senses whether the oscillator leads or lags the burst phase and outputs a "high" (hi) signal on conductor 18 or 19 to digital AND gates 20 and 21. A clock signal on conductor 22 provides a continuous series of pulses to gates 20 and 21. When the clock is hi, one of the two AND gates (up or down) will have both inputs hi and will cause the 4 bit digital counter 23 to count up or down. Upon overflow thereof the second 4 bit counter 24 continues to count up to a binary 8. This permits up to 256 levels.

Counters 23 and 24 operate eight transmission gates (TG) 25, each of which, when actuated, connects a resistor of network 26 to ground. The resistor network 26 is connected to and controls the phase angle of phase-shifter 16. Phase comparator 17 continues to call for phase shifting until phase-shifter 16 causes the oscillator 14 signal to match the phase of the foreground video subcarrier signal.

A gate signal $E_c'$ that is connected to comparator 17 permits phase comparison to be made only when the video signal represents blue backing. The phase comparator compares the phase of the phase shifted oscillator signal with the phase of the foreground subcarrier signal only when the foreground video represents an illuminated area of the blue backing. Gate signal $E_c'$, to be described later, defines the blue backing and gates comparator 17 at such times as the backing is visible and illuminated.

The output of phase-shifter 16 is also connected to the x-input of four-quadrant multiplier 27. This causes the level thereof to be adjusted to match the amplitude of the subcarrier of the foreground video in the area of the blue backing. The phase shifted subcarrier signal is connected via conductor 28 to the negative (subtractive) input of operational amplifier 29. The foreground video signal is conveyed to the positive input of amplifier 29 from conductor 11. Assuming that the two signals entering amplifier 29 are at equal levels and of matching phase, chroma is removed from the backing area. Chroma contamination is also removed from the foreground subject.

The matching of subcarrier levels is accomplished by connecting the output of multiplier 27 via conductors 28 and 30 to envelope detector diode 31. This diode, with associated capacitor and resistor constitutes an envelope detector. Operational amplifier 32 compares the rectified output of multiplier 27 with the rectified video signal at conductor 11. A positive or negative difference output results. This output is sampled by transmission gate 33 in the region of the colored backing, as determined by gate signal $E_c'$. The sampled signal is held as a charge in capacitor 34 during the interval between $E_c'$ gate pulses and is delivered to comparator 35, 36. When the signal charge upon capacitor 34 is above or below zero, comparator 5, 36 energize either AND gate 37 for an upward count or AND gate 38 for a downward count of counters 39 and 40.

These counters selectively close combinations of eight transmission gates, numbered 41 as a group, to control shunt resistors connected to each, which control the level of $E_b$ that is fed into the Y input of multiplier 27. It is the Y input that determines the gain of multiplier 27 for the X input signal. Potentiometers 42 and 43 provide a small dead band so that counters 39 and 40 do not hunt.

Since control signal $E_b$ is sensitive to lens flare and to secondary blue illumination of the subject, chroma is removed from the backing and chroma contamination is removed from the subject, leaving no evidence that a blue backing was ever present.

Control Signal $E_c$

Since control signal $E_b$ does not always go the zero in the subject area, it is not suitable for the control of the background scene video level. It is thus necessary to develop a second control signal $E_c$.

Control signal $E_c$ is linearly proportional to the brightness and visibility of the colored backing, and is employed, after clipping, to control the level of the background scene. When $E_c$ is at the clip level selected, the background scene is at full (unity) level. In the region of an opaque foreground subject, $E_c$ must be at zero level so as to fully shut-off the background scene. If the background scene is not fully suppressed, it will superimpose, or "print through", the foreground subject.

The basic equation for developing a control signal as used by chroma-key devices has been in the general form of $E_c = B - (G+R)/2$. This equation is adequate for black and white and several colors. However, for the color cyan there is no red, R, and thus the $(G+R)/2$ term must be raised in gain by a factor of 2 in order for $B - (G+R)/2$ to equate to zero. Magenta also requires the same increase in gain. Doubling the gain raises the noise level by 6 db. Doubling the gain also causes edge effects on all colors except cyan and magenta.

For cyan the ideal equation is $E_c = B - G$, and for magenta the equation should read $E_c = B - R$. Both equations can be realized at the same time with the form $E_c = B - (G \text{ OR } R)$, in which the OR term represents a linear OR gate, the output of which is the greater of green or red. Thus, it is possible to composite both cyan and magenta in the same scene, together with other colors, without the 6 db noise penalty and without causing an outline around foreground subjects.

A major problem encountered in compositing is the reflection of the backing color by dark glossy objects that contain little or no green or red. The term $B-(G \text{ OR } R)$ does not reduce to zero when blue is significant and green (G) and red (R) are both zero. It is possible to add a constant, such as the $-K_2$ term in $E_c = B - (G \text{ OR } R) - K_2$ to represent and remove the amount of blue being reflected. However, this constant also reduces $E_c$ in the fully illuminated backing area and thus requires interactive adjustments of the level and black gloss controls.

A non-reactive black gloss adjustment should reduce the $E_c$ value only when blue is at some point less than is found on the fully illuminated backing, so as not to affect the level of the background scene. It is possible to composite cyan and magenta as well as reflective black objects in the same scene when the second control signal $E_c$ has the following form:

$$E_c = [B - K_1(G \text{ OR } R) - K_2(K_3E - B)]^+ \qquad \text{Eq. 2}$$

The circuit that accomplishes the above $E_c$ equation is explained in conjuction with the showing of FIG. 1 in the following way. The green video signal on conductor 47 and the red video signal on conductor 48 from the foreground source 1 are connected to linear OR gate 49. The output of the same is the larger of the green and red signals and is connected to the potentiometer $K_1$, element 50. The blue signal on conductor 46 is connected to the positive input of operational amplifier 51. The $K_1$ value is connected to the negative input of amplifier 51. With these two inputs, the output of amplifier 51 is $B - K_1(G \text{ OR } R)$. This is the first term of equation 2, and the second term.

The blue signal on conductor 46 is also connected to the negative input of operational amplifier 52. A d.c. voltage E, which may be $+5$ or $+12$ volts, is connected to potentiometer $K_3$, element 53, for adjustment and feed to the positive input of amplifier 52. The output of amplifier 52 is connected to potentiometer $K_2$, element 54, for adjustment and feed to the negative input of amplifier 51. The output of amplifier 52 at $K_2$ is the third term of equation 2. The positive symbol in equation 2 indicates the presence of zero clip element 55 to prevent negative values of the equation.

Black Gloss

Assume that the blue backing is at full illumination and provides a blue video signal of 1 volt, with no significant red or green signal. If $K_3E$, at potentiometer 53 is adjusted to 1 volt, then the inputs to amplifier 52 are equal and the output thereof will be zero. With the consequent zero potential on potentiometer $K_2$, the adjustment thereof will have no influence on $E_c$.

However, on a 20% reflective dark object, that object will provide a 0.2 volt blue video signal. The $K_2(K_3E - B)$ term will provide a maximum offsetting voltage of 0.8 volt. Thus, by setting $K_2$ to $\frac{1}{4}$, the offsetting voltage becomes 0.2 volt, which exactly cancels the blue reflection, to result in an $E_c$ of zero. The circuit shown can reduce $E_c$ to zero even in the presence of an object that is as much as 50% reflective to the backing.

Equation 2 is a linear equation and so $E_c$ is linear. Nonlinearity of $E_c$ can occur because of less than perfect electronic component circuit elements, or by deliberate manipulation.

The linear system provides complete and realistic retention of the full transparency range of foreground subjects and a full range of shadow densities.

However, it is sometimes preferable to depart from linearity enough to hide such defects on the stage set as cracks or seams in the colored backing, to remove fine support wires holding suspended subjects, to emphasize desired shadows, or to remove unwanted shadows. These functions can be accomplished as described below.

Cleanup

A footprint upon a blue floor consists of a very thin layer of just visible dust that slightly dims the brightness of the blue floor. The foreground scene in the footprint area is nearly but not exactly zero, and the background scene is not exactly at full level.

Assume that the footprint is 90% transparent and 10% reflective. The cleanup function then operates as follows.

Referring to FIG. 1, $E_c$ at 0.9 volt represents a 90% transparent footprint and is connected from conductor 108 to operational amplifier 124 through gain control 125. Amplifier 124 typically has a gain of about 5. Control 125 is set to produce a level of about 1.5 volt to linear OR gate 126, and thence to balance control 127. When centered, this control provides an equal signal level that exceeds 1 volt to foreground multiplier 94, which shuts it off, and to background multiplier 109, which turns it fully on. If, in the footprint, the foreground signal is off and the background signal is on, then the footprint has disappeared.

When subject to the cleanup control 125 the linear $E_c$ signal becomes partially nonlinear.

The $E_c$ source for the cleanup function originates from the $E_c$ signal at conductor 108, after it has been subjected to automatic level control and clip. Thus, the cleanup function is constant over a wide range of variables in camera adjustment and in lighting of the set. The cleanup function thus enjoys the advantage of stability without requiring a separate automatic level control circuit.

Shadow Control

The black gloss circuit previously described also becomes a shadow control circuit by manipulating $K_3$, potentiometer 53.

When lighting a full figure on a stage, using a key light and two or more fill and modeling lights, there is visible on the blue floor one medium shadow and multiple light shadows from these light sources. By adjusting $K_3E$ to a lower value, the inflection point (the point at which $K_2$ will have no influence on $E_c$) is lowered. By setting $K_3E$ to a value of 0.5 volt, for example, means that $K_2$ will have no influence on $E_c$ when $E_c$ is at 0.5 volt. However, with $K_2$ at maximum setting and $K_3E$ at 0.5 volt, a blue signal of 0.75 volt will produce an $E_c$ of 1.0, while a blue signal of 0.25 volt will produce an $E_c$ of zero. Thus, a light shadow having a density of 25% will vanish, a medium shadow of 50% density will not be affected, and a shadow of 70% density will be increased to 90% density.

A shadow of 70% density represents an illumination of 30% in that area. A black or dark glossy object that reflects 30% of a fully illuminated backing provides a video signal identical to that of the 70% shadow. The black gloss control $K_2$ thus becomes a shadow control, when used in conjunction with the $K_3E$ control to set the control inflection point.

Gating Pulse $E_c'$

The comparators used in the automatic phase and level control circuits make comparisons of those video values that occur when the video signal represents an unobstructed portion of the colored backing that receives good illumination.

Since $E_c$ is proportional to the brightness and visibility of the colored backing, when $E_c$ has a peak value that is above a minimum level representing good illumination, then $E_c$ properly identifies that portion of the foreground video signal representing the colored backing. Within these limits $E_c$ is used to generate a square wave gating pulse $E_c'$.

Generation of the gating pulse is explained in conjunction with FIG. 1. $E_c$ on conductor 56 is connected to zener diode 57, which has a voltage rating representing the $E_c$ value for a backing receiving about half normal illumination. When $E_c$ is above this zener limit it will pass through diode 57 and will be coupled through capacitor 58 to comparator 59. Any positive voltage into the positive terminal 59 will cause the output at 65 to promptly rise to the power supply voltage, typically +5 or +12 volts. As $E_c$ rises above about 0.3 volt, current begins to flow through diode 60 and charge capacitor 58. Resistor 61 discharges capacitor 58 in the absence of $E_c$.

Diode 57, capacitor 58 and diode 60 represent a peak detector having about a 0.3 volt "on" band.

Gating pulse $E_c'$ is formed on each line and lasts for the duration that $E_c$ is within 0.3 volts of its peak value, and above at least half of its normal value. This half level cut-off point is chosen to represent some practical minimum illumination below which there is not sufficient light for good compositing.

$E_c'$ is used to gate all comparators in the automated circuits. This pulse also gates clock 62, which is an astable multivibrator that generates a pulse train of square-wave pulses. The clock is used to sample the AND gates, which in turn, operate the digital counters.

In the event the camera pans off of the backing, $E_c'$ goes to zero and therefore the $E_c'$ gate is not generated. Without the $E_c'$ pulse to operate transmission gate 63, clock 62 is inoperative. Without clock pulses, all digital counters become digital memories and hold all level settings until the camera returns to the backing and the $E_c'$ gating pulses are reestablished.

The above is an automatic process of great value.

The clock circuit may also be disabled by manual switch 64. With no clock pulses reaching the rest of the circuit and all level values held in memory, this manual override makes it possible to create special effects. Such effects include irising down the camera to create a night scene effect, altering hue response of the camera to cause an overall color tint, and others of like nature.

Level Comparator, Digital Memory Level Controller

Figure 3:
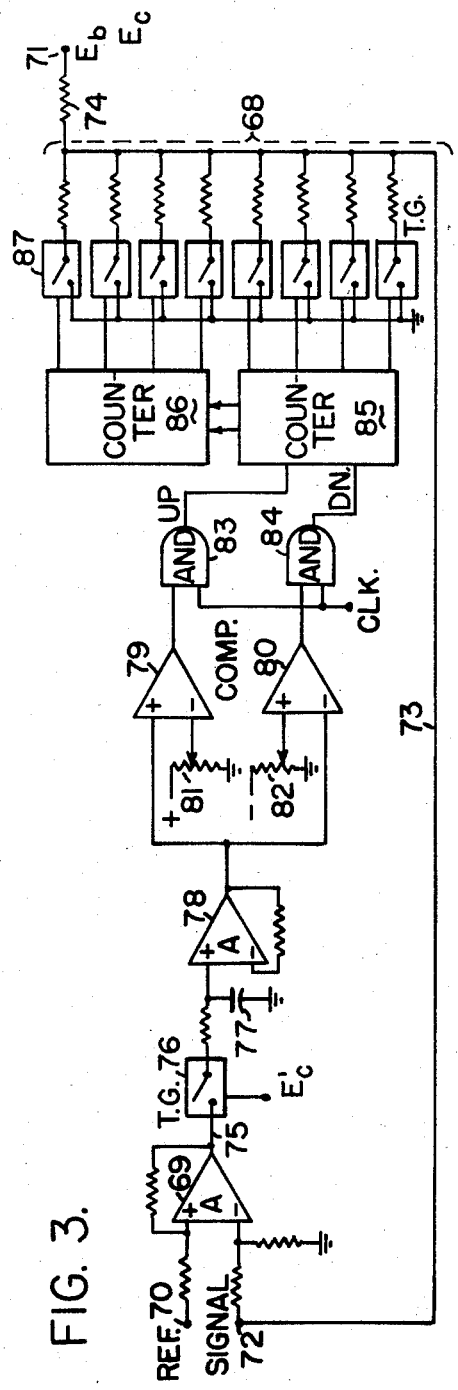
FIG. 3 is the schematic diagram of the controller circuit, which is employed for elements 91, 97 and 105 in FIG. 1.

FIG. 3 gives the internal circuit for the comparator-controllers 91, 97 and 105 of FIG. 1.

In FIG. 3, operational amplifier 69 has two inputs. One is a reference signal that is to be matched and is connected to the negative input at 70. The other is the signal to be controlled, $E_b$ or $E_c$, at 71, which is connected to the positive input via conductor 73 after being routed through load resistor 74.

When the input at 72 is larger than the input at 70, the output at conductor 75 will be positive. The output is sampled by the actuation of transmission gate (TG) 76 by gating pulse $E_c'$. The output is stored in capacitor 77 until the next sample arrives.

Voltage follower 78 feeds two comparators 79 and 80. When the levels are matched the output of voltage follower 78 is zero volts. A slightly positive reference voltage from potentiometer 81 is connected to the negative input of comparator 79, while a slightly negative reference voltage from potentiometer 82 is connected to the positive input of comparator 80. When the levels are matched and the output of voltage follower 78 is zero, both comparators 79 and 80 outputs will be low (negative). The AND gates 83 and 84 outputs will both be zero (low), and counters 85 and 86 will not change.

Initially, the signal at 72 is usually "hi", and a positive signal is developed at conductor 75 and follower 78. Comparator 79 turns "on" and provides a "hi" input to AND gate 83. Each clock pulse is also "hi" and causes gate 83 to output a "hi" signal to the "up" input of counter 85. As long as the positive condition lasts, each clock pulse will advance the counter. This activates the several transmission gates identified as 87 for the group in a selective manner to successively shunt additional resistance to ground, thus lower the level of the signal on conductor 73.

There are eight transmission gates, each connected to a resistor. A satisfactory control range is obtained when in FIG. 3 the top resistor of bank 68 is 100 ohms and each successive resistor below is doubled; i.e., 200, 400, 800 ohms, etc., when load resistor 74 is approximately 1,000 ohms. When a counter output is "hi", the corresponding transmission gate closes to ground the corresponding resistor.

When the number of counts overflow counter 85, the additional counts are counted by counter 86. Since there are eight binary counts and eight resistors, the level of the signal can be controlled in 256 increments. Potentiometers 81 and 82 permit the set-in of a small dead band so that the counters do not hunt.

Analog Memory

As an alternate embodiment for automatically controlling a signal level to match a reference level it is possible to use comparator 79, 80 to control the resistance of a field-effect transistor (FET) in place of the digital counters, transmission gates 87 and resistors. It is also possible to use a low leakage capacitor as a storage or memory device. The digital counters and resistors are preferred because of the poor linearity of FET devices. The counters are preferred over a capacitor as a memory device since the capacitor is subject to discharge with time and external leakage.

The issue is not the memory itself, but rather that unique control criteria ($E_c/E_b$) are combined with automatic balance circuits to continuously track and null both chroma and luminance of the backing and to maintain a constant background scene level in spite of major changes in the lighting, camera iris and camera color adjustments. The digital control and memory are the preferred means for accomplishing level control and memory.

Removal of Backing Luminance

The level comparator and digital level controller of FIG. 3 is used for automatic matching and removal of backing luminance. FIG. 1 shows the means and indicates the method for eliminating the luminance of the blue backing in the foreground signal so as to render it black.

The foreground video signal at conductor 90, after the removal of chroma by amplifier 29, enters comparator digital memory level controller 91. Within the blue backing area, control signals $E_b$ and $E_c$ are both proportional to the brightness and visibility of the backing. $E_c$ is zero in the foreground subject area and thus has no influence on the back lighting of the subject caused by the illuminated backing. Thus the $E_c$ signal will remove the luminance in the backing area, but not the luminance cast onto the subject by the backing. The back-lighting and edge lighting of the subject caused by the backing is preferably retained when the background scene that is inserted is a daylight scene. Accordingly, the $E_c$ control signal is used.

However, a night background scene would have cast very little luminance upon the fireground subject. Luminance from the blue backing is therefore preferably removed. Accordingly, the $E_c$ control signal is used.

The selection of an $E_b/E_c$ mix can be made by potentiometer control 92, or by fully automatic means as determined by the average brightness of the background scene over a whole frame. For the following discussion the term $E_{cb}$ will be employed to represent the $E_c/E_b$ mix to be used as the input to the level control unit 91. The output on conductor 93 of unit 91 is connected to the negative input of the differential X input of multiplier 94. $E_{cb}$ is subtracted from the foreground video signal by the differential input to multiplier 94. A multiplier is preferred at 94 in place of an operational amplifier because of the clean-up and key-in functions that require level control of the foreground video.

When the signal into controller 91 exceeds the dead band, the digital counters, controlling level, decrease the level of $E_{cb}$ connected to the negative X input of multiplier 94 and to the signal input of controller 91. The clock continues counting up or down until signal into controller 91 matches the level of the reference in the blue backing area as defined by and gated by $E_c'$.

This circuit automatically determines and removes, by subtraction, the backing luminance. It may also remove all, none, or a portion of the back-lighting of the subject received from the backing.

In television news programs, retention of the back-lighting is generally preferred, since it produces a pleasing image and realism is not an issue. In a television drama, automatic selection of either $E_b$ or $E_c$ is preferred, to thereby achieve a sense of realism in situations where the average background scene brightness varies rapidly over a wide range of values.

Control of Background Level and Glare Noise

Control signal $E_c'$, as developed at conductor junction point 56 in the circuit of FIG. 1, is used to control the level of the background video signal. In normal operation the background signal remains at unity gain through the system, where the backing is fully visible and is at normal illumination.

Since $E_c$ is proportional to the backing illumination and since the level of the background scene is proportional to $E_c'$, any irregularity in backing illumination is reflected as an irregularity in the level of the background scene.

Since it is very difficult to obtain perfect uniformity of illumination over the (blue) backing, the $E_c$ value at some point on the backing, such as a corner, representing an area of lower illumination, is selected as a clip point. A clipping circuit then holds all values of $E_c$ over the clipping level to the level of the clip. All levels below the clipping level are then proportional to the level of backing illumination intensity. It is this proportional relationship that permits the reproduction and transfer of backing shadows to the background scene.

Any reduction of backing illumination will cause a reduction of $E_c$ and it may reduce $E_c$ below the clipping level, with a consequent loss of background scene level. When $E_c$ exceeds the clipping level by more than a nominal amount, it causes brightening of the edges of foreground subjects. It is therefore essential to control the level of $E_c$ before it reaches the circuit elements that accomplish clipping.

Apparent light level changes occur because of changes in power line voltage to the lighting units, of a change of the camera lens iris, or of a change in any of several video camera adjustments. Prior to this invention, these changes would require the operator to monitor and readjust the chroma and background level controls.

However, this invention provides means that automatically controls the level of the background scene to the unity gain level and also maintains the peak $E_c$ level at a fixed percentage over the clipping level.

Glare - Noise

Since $E_c$ is the result of combining the several terms in the $E_c$ equation, the noise level of $E_c$ is greater than is found in the individual R G B terms by as much as 6 to 12 db. Thus, it is desirable to substitute the blue term for $E_c$ when the $E_c$ signal represents the backing area, since the two signals are essentially identical in this area.

Also, lighting units that back-light a subject and cause shadows to fall toward the camera, will cause glare from the blue floor. This white glare component includes substantial amounts of red and green. Thus, $(B-G)$ will be higher in the shadow than in the glare area. The shadow will be inverted and will be seen as lighter than the surrounding area rather than darker, as a shadow should be. By substituting the blue signal in place of the $E_c$ signal only in the blue backing area; floor glare is removed, shadows become normal and the noise level in shadow areas is reduced by 6 db or more.

The automatic blue/$E_c$ substitution and the automatic control of background scene level is accomplished as follows. Referring to FIG. 1, control signal $E_c$ at conductor junction point 56 and with switch 123 closed, is connected to automatic level controller 97, the output of which is connected linear AND gate 98. This automatic level controller was fully described in conjunction with FIG. 3. It is identical to controller 91.

The blue video signal from the foreground camera upon conductor 46 is connected through resistor 99, to level adjustment section 100 of automated circuit 97, to the signal input of controller 97, and to linear AND gate 98 through level adjustment control 101. Controller 97 causes the blue signal at 102 to match the $E_c$ signal level.

Potentiometer control 101 is adjusted to make the blue signal entering linear AND gate 98 slightly less than the $E_c$ level entering that gate. The output thereof upon conductor 103 will be the lower of its two inputs. Thus, in the blue backing area, blue video is the output. In all areas of the subject $E_c$ is the output.

Thus, the blue video signal (for a blue backing) becomes an alternate second control signal. The second control signal $E_c$ is hence modified as follows:

$$E_c = KB \text{ AND } [B - K_1(G \text{ OR } R) - K_2(K_3E - B)]^+ \qquad \text{Eq. 3}$$

The $E_c$/Blue on conductor 103 is conveyed to load resis-104 and into level controller 105 at 111. Clip level adjustment potentiometer 106 sets a d.c. level into linear AND gate 107. Also connected to linear AND gate 107 is the regulated $E_c$/Blue signal from linear AND gate 98 as found at conductor junction 111. The output of linear AND gate 107 appears on conductor 108 and cannot exceed the clip level set by control 106. This clip level sets background multiplier 109 for a nominal gain of unity. The d.c. voltage set by clip level adjustment potentiometer 106 is connected to control potentiometer 110, which permits a d.c. level to be established that is a small percent greater than the clip level set by clip control 106. The percentage over clip is a selected constant and represents the level to which the second control signal is automatically matched.

Level comparator and digital level controller/memory, element 105, will cause the output signal at conductor junction 111 to be equal to the percent over clip setting of control potentiometer 110. When $E_c$ is below clip, output at conductor 108 is $E_c$. When $E_c$ into linear AND gate 107 exceeds clip, $E_c$ at output terminal 130 remains at the clip level established by clip control 106.

If the percent over clip potentiometer 110 is set to zero, then the maximum $E_c$ output at conductor 108 will exactly equal the clip level set by clip control 106. Since the comparator makes the comparison when $E_c'$ is present, and that represents the brightest area of the blue backing, that area will cause the background level to be at full intensity. All other areas of the backing have a lower intensity and will provide less than full turn-on of the background. This is the situation by which shadows on the backing become shadows in the background scene.

It is the purpose of the percent over clip control 110 and level controller 105 to allow the $E_c$ control signal on conductor junction 111 to exceed the clip level by 10% to 20%, so that a non-uniformity of backing illumination of this magnitude can be tolerated and still full turn-on of the background scene be accomplished. It is essential; however, that the percentage over clip level be as small as practical, to maintain a full range of shadow densities and to prevent subject edge brightening.

The background level control signal $E_c$ at the AND gate output conductor 108 is connected to background level control multiplier 109 through linear OR gate 131. The multiplier controls the level of the background scene video signal from conductor 128. The background scene is routed from multiplier 109 to the summing terminal of amplifier 112, where it is summed with the foreground signal from multiplier 94.

Simple addition of foreground and background scenes is possible because control signal $E_c$ permits the background video signal to be present only to the extent and in the area where backing was visible. Having removed the chroma and luminance from the backing area by subtraction, there is no need to shut off the foreground scene. The two scenes may therefore be combined by simple addition. Only in this way can the two scenes be combined and retain full camera resolution and a full linear range of transparencies.

Full resolution is retained because the foreground video signal passes through an always open foreground video channel. Referring to FIG. 1, the foreground video signal at conductor 11 is connected to the positive input of differential amplifier 29. An input at the negative terminal of this amplifier can add or subtract from the video signal, but both the positive and negative inputs are independent. There is nothing to impede or obstruct the passage of video signals through amplifier 29. In a similar manner, the foreground video signal again enters a differential input at multiplier 94. Except when purposely shut-off or altered for a window effect or a clean-up action, multiplier 94 is fully open to the passage of foreground video signals. It is for this reason that all foreground detail that appears at the foreground input conductor 11 also appears at the output of adder 112 without loss.

Nevertheless, the foreground and background scenes can also be combined by non-additive mixing, as in chroma-key systems. In this method the foreground scene is turned off as the background scene is turned on. While an acceptable composite image is sometimes obtained, it is inferior because such isolated detail as strands of hair is not reproduced, and only the denser portions of smoke, fog and other transparencies are retained.

PAL System PLL Oscillator

The circuit of FIG. 2 shows one phase lock loop (PLL) oscillator as element 14. This is the circuit for an NTSC color encoding method.

Because of the great similarity of the PAL color encoding method, little change is required in the apparatus of this invention to accommodate PAL encoding. The change consists of replacing PLL oscillator 14, operating at 3.58 mHz, with two oscillators 115 and 116, operating at 4.43 mHz, also of the PLL type, as shown in FIG. 4.

In the PAL (Phase Alternate Line) video system, a specific color is represented by a specific phase of a subcarrier that is derived from two perpendicular vectors, one of which alternates in phase. A color will then be represented by a phase vector that alternates on every second line of video scanning. The amount of phase shift is related to the specific hue to be reproduced. In theory, the phase of a hue on any line will precisely define the phase of that hue on the following line. In practice, there can be slight differences in phase from line to line if the subcarrier vectors are not accurately perpendicular.

A compositing device must produce an accurately phase-matched subcarrier for each alternate phase that can be subtracted from the foreground composite video signal to remove chroma from the (blue) backing area. Precise subcarrier generation in the PAL embodiment of this invention has been achieved with two phase locked loop oscillators.

Figure 4:
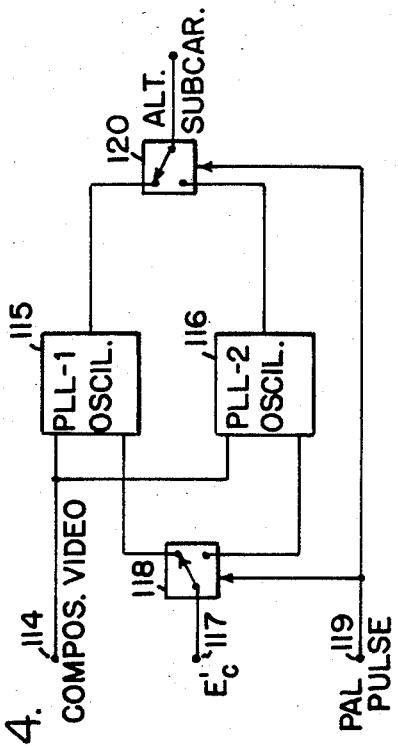
FIG. 4 is the diagram of an alternate oscillator arrangement for FIG. 2, which is suited for compositing the PAL format of video signals.

In FIG. 4, elements 115 and 116 are the phase lock loop oscillators. These are gated to lock to the actual backing color by stated control signal $E_c'$, which is introduced at conductor terminal 117 and is alternately presented at the gate input of each PLL oscillator. This is accomplished by CMOS switch 118, which is controlled by the PAL pulse that is entered at conductor terminal 119. The output subcarriers are similarly switched by CMOS switch 120.

The composite video signal is entered at conductor terminal 114 and is conducted to each of the PLL oscillators 115 and 116.

The result is the generation of a perfect alternating subcarrier vector that represents the hCue of the backing on each phase alternate line of video signal. This generated subcarrier will accurately subtract the backing chroma regardless of errors in quadrature in the input system. This will occur even if the input system drifts in hue or quadrature while the system is compositing.

Non-Composite Flare Removal

When a camera lens is essentially filled by a field of view of a single color, that color, through multiple internal lens reflections, causes a color cast to exist over the whole field of view, including any foreground subjects that are present. This is the typical situation of a subject in front of a colored backing.

When the foreground subject is composited, this invention removes the color contamination caused by the backing. There is therefore a sudden difference in the appearance of a newscaster, for example, when the news scene suddenly replaces the colored backing. A dramatic improvement in the non-composited foreground image occurs when the known blue cast from lens flare is removed from the foreground subject. The appearance of the foreground subject can be kept constant by removing the chroma discoloration of the subject in the non-composited foreground image. This can be accomplished by utilizing a special control signal to selectively remove chroma from foreground objects but not from the backing.

The term $E_d$ is used to designate the special control signal to be used in place of $E_b$ when the camera is in the direct view mode and is not compositing. This is a difference signal defined by:

$$E_d = E_b - E_c \qquad \text{Eq. 4}$$

Referring to FIG. 1, $E_d$ is obtained by connecting both $E_b$ and $E_c$ to operational amplifier 121. Switch 123 removes the background scene. Switch 122 replaces $E_b$ with $E_d$.

In this configuration the colored backing is retained, but its discoloration of the foreground subject is removed.

Post Production

Referring to FIG. 1, when it is desired to insert a variety of background scenes behind the same foreground subject, or to insert a background scene at a later time, the foreground subject may be recorded through the compositing apparatus with the background video signal omitted. The recording will show the subject against a black background. If one also records the matte signal, available at terminal 130, which is a regulated $E_c$ signal, it is possible to insert a variety of background scenes behind the recorded foreground scene. This is accomplished by connecting the recorded foreground video signal as the foreground source at conductor 11.

The selected background video signal constitutes the background video source 129. The recorded matte signal 130 is relayed into linear OR gate 131, where that signal controls only the background scene video signal level. It does not affect the foreground scene video signal. The video signal level of the background scene as mixed with the foreground scene is a linear function of the recorded matte signal. Because the recorded matte signal was controlled by automatic level control circuits 97 and 105, it is free of any instability that might have been caused by variations in camera and lighting.

It is possible to simply record the foreground video scene with its colored backing directly to tape, using either the NTSC or PAL encoding processes. These signals can be subsequently decoded to regenerate the R G B signals needed for compositing. The resulting composite image; however, is noticeably inferior to the composite image achieved when the original R G B signals directly from the camera are used to generate the matte signal.

The linear replay of the matte signal provides composite images having a quality equal to that obtained when using live wide-band R G B signals directly from a video camera.

Provisions are made as an input to linear OR gate 126 at 113 to accept a conventional key or switching signal from a video switcher to input fades, wipes, windows and other effects.

Circuit Components

Referring to FIG. 1, amplifiers 2, 3, 4, 6, 51, 52, 121 and 124 are operational amplifiers, such as the Harris HA 2525. Operational amplifier-driver 112 may be a Harris HA 5195. Comparator 59 may be an LM 339N, made by National Semiconductor.

Linear OR gates, 5, 127, 131, may be constructed of two NPN and two PNP transistors in a single dual in-line package, such as the Motorola MPQ6002. Linear AND gates 98 and 107 utilize the same MPQ6002 integrated circuit (IC) but are connected to produce the AND function.

The zero clip (ZC) is an OR gate with one input grounded.

Multipliers 94 and 109 may be Motorola type MC 1595.

In FIG. 2, PLL oscillator 14 may be an RCA IC CA 3126. Phase rotator 16 is an operational amplifier connected as a phase-shifter, as shown in handbooks on operational amplifiers. The Harris HA 2525 is suitable for elements 16 and 32.

Phase comparator may be an RCA CD 4046 IC.

The digital AND gates 20, 21, 37, and 38 may be an IC type 7408, available from several manufacturers.

Counters 23, 24, 39 and 40 may be a type 74193 IC, available from several manufacturers.

Multiplier 27 may be the Motorola part MC 1595.

Comparators 35 and 36 may use the LM 339N, an IC made by National.

Transmission gates 25 and 41 may consist of RCA part CD 4066.

The four resistors associate with each operational amplifier are typically 1,000 ohms each.

In FIGS. 3 and 4, amplifiers 69 and 78 may be the Harris HA 2525.

Comparators 79 and 80 may be the National type LM 339N.

Digital AND gates 83 and 84 may be type 7408.

Counters 85 and 86 may be type 74193.

Transmission gates 76, 87, 118 and 120 may be the RCA CD 4066.

Phase lock loop oscillators 115 and 116 may be the RCA CA 3126.

For purposes of clarity, certain circuit details associated with video elements, such as clamping to remove d.c. offset, are not shown since this practice is common in all video apparatus. Likewise, resistors connecting to multipliers, certain operational amplifiers, and other integrated circuits are not shown, since the data sheets provided by the manufacturers show these data in ample detail.

Potentiometers, when used in the negative input of an operational amplifier are typically of 100 ohms resistance. All other potentiometers have a resistance of 1,000 ohms, or possibly more.

Herein, the term first control signal is synonymous with the symbol $E_b$, second control signal with $E_c$, mixed control signal with $E_{cb}$, and gating pulse with $E_c'$.

We claim:

1. A method of automatically controlling the compositing of encoded color image background scene and foreground scene video signals involving a background scene and a foreground scene having a foreground subject placed before a colored backing, which comprises the steps of;

(a) forming a first control signal $E_b$ as a function of the brightness and visibility of the colored backing and also as a function of a secondary illumination on the foreground subject received from the colored backing, said first control signal $E_b$ being input to a foreground video subtraction circuit;

(b) forming a second control signal $E_c$ as a function of the brightness and visibility of the colored backing, but not as a function of the secondary illumination being reflected from the foreground subject, said second control signal $E_c$ being input to a background video level control circuit;

(c) forming a gating pulse identifying that portion of the foreground scene representing the colored backing;

(d) comparing and automatically controlling the phase-angle of a generated subcarrier signal to match the phase-angle of a foreground video subcarrier signal during said gating pulse;

(e) comparing and automatically controlling the level of the generated subcarrier signal to match the level of the foreground video subcarrier signal during said gating pulse;

(f) removing the chroma of the colored backing, and discoloration chroma from the foreground subject resulting from the secondary illumination by subtracting the phase and level matched generated subcarrier under control of the first control signal $E_b$ from the foreground scene video signal;

(g) automatically comparing and adjusting the level of the second control signal $E_c$ to match the level of the foreground scene video signal during the gating pulse;

(h) removing the luminance of the colored backing from the foreground scene video signal by subtracting the adjusted level of the second control signal $E_c$ from the foreground scene video signal;

(i) comparing the second control signal $E_c$ during the gating pulse, with a predetermined constant and automatically adjusting the level of said second control signal $E_c$ to match the level of the constant; and (j) combining the foreground scene video signal, the colored backing chroma and luminance thereof having been removed, with the background scene video signal, the level of which has been controlled by the second control signal, to form a composite video image.

2. The method of claim 1, in which;
the combining of the foreground and the background video signals is accomplished by simple addition.

3. The method of claim 1, in which;
the combining of the foreground and the background video signals is accomplished by non-additive mixing, wherein the foreground signal level is reduced as the background signal level is increased, and vice-versa.

4. The method of claim 1, in which;
the function by which the first control signal varies may be linear, partially linear, or non-linear with respect to the variations of illumination on the colored backing and with respect to the backing illumination reflected from the foreground subject.

5. The method of claim 1, in which;
the function by which the second control signal varies may be linear, partially linear, or non-linear with respect to the variations of illumination on the colored backing.

6. The method of claim 1, in which;
the foreground video channel is open at full level throughout an entire video frame.

7. The method of claim 1, in which;
the levels compared and automatically matched are automatically retained when the colored backing is no longer in the foreground scene.

8. The method of claim 1, in which;
the levels compared and automatically matched are selectively manually retained.

9. The method of claim 1, in which;
the automatic control of level and phase is accomplished in digital increments.

10. The method of claim 7, in which;
said levels are digitally retained.

11. The method of claim 1, in which;
back and edge-lighting luminance on the foreground subject received from the colored backing, is retained in proportion to the amount by which the second control signal exceeds the first control signal in removing backing luminance.

12. The method of claim 1, wherein the effects of backing surface glare and noise are eliminated by the additional method steps of;

(a) forming an alternate second control signal consisting of a red, green or blue primary video signal which represents the dominant hue of the colored backing, (b) automatically controlling the level of the alternate second control signal to match the level of the second control signal in the backing area defined by said gating pulse, (c) comparing a portion of the alternate second control signal with the second control signal, and (d) utilizing the lesser of the compared signals to control the level of the background scene video signal.

13. The method of claim 1, in which;
the white balance of the foreground subject, discolored by illumination from the colored backing is restored by limiting the video amplitude of the video signal representing the backing color.

14. The method of claim 1, wherein lighter shadows are made lighter and darker shadows are made darker, which includes the additional method steps of;

(a) adjusting the gain and negative voltage offset of that red, green or blue primary video signal that represents the dominant hue of the colored backing, and (b) utilizing the adjusted gain and offset of that video signal to establish a reference level such that when the primary video signal representing the dominant hue of the colored backing exceeds the reference level it is further increased, and alternately, when it falls below the reference level it is further decreased.

15. The method of claim 1 wherein backing and lens flare are removed from the foreground subject when not compositing, which includes the additional method steps of;

(a) subtracting the second control signal amplitude from the first control signal amplitude to form a difference control signal, (b) substituting the difference control signal in place of the first control signal for selectively removing foreground chroma from the forground subject, (c) disconnecting the second control signal from the background video level control circuit.

16. The method of claim 1 wherein chroma of the foreground scene is encoded by the phase alternate line (PAL) process, and wherein the removal of backing chroma includes the additional steps of;

(a) comparing and automatically matching the phase-angle of the generated subcarrier to the phase-angle of the first phase line of video signal in the colored backing area, (b) comparing and automatically matching the phase-angle of a second generated subcarrier to the phase-angle of the phase alternate line of video signal in the colored backing area, (c) selecting the generated subcarrier, the phase of which has been matched to its corresponding video signal line and automatically matching the level of the generated subcarrier to the level of the subcarrier representing the hue of the colored backing, and (d) subtracting each generated subcarrier from its corresponding line of video signal for the removal of colored backing chroma.

17. The method of claim 16, in which;

each of said first and second generated subcarriers phase-locks to its corresponding line of video signal in the presence of quadrature error.

18. The method of claim 1, in which;

(a) the first control signal $E_b$ is represented by an equation of the form:

$$E_b = \{(K_3 B - G) - K_1(G - R) \text{ OR } K_2(R - G)\}^+,$$

(b) wherein OR designates the larger of G-R and R-G, (c) the + symbol designates positive values only of $E_b$ in the equation, and (d) $K_1$, $K_2$ and $K_3$ designate predetermined constants.

19. The method of claim 1, in which;

(a) the second control signal $E_c$ is represented by an equation of the form;

$$E_c = \{B - K_1(G \text{ OR } R) - K_2(K_3 - B)\}^+,$$

(b) wherein OR designates the larger of G and R, (c) the + symbol designates positive values only of $E_c$ in the equation, and (d) $K_1$ and, $K_2$ designate predetermined constants, and $K_3$ designated a predetermined voltage level.

20. The method of claim 1, in which;

(a) the second control signal $E_c$ is modified to eliminate glare light effects and to reduce background noise level, (b) wherein the modified $E_c$ is expressed as:

KB AND $E_c$ (c) wherein AND designates the lesser of two values, and (d) K designates a predetermined constant.

21. The method of claim 1, in which;

the gating pulse is present on each foreground video line when the second control signal is within a small range near its peak value and when said peak value is above a selected minimum value.

22. An electronic apparatus for compositing encoded color image video signals involving a foreground subject disposed before a colored backing and a background scene, which comprises;

(a) a source of foreground composite video signals (1) containing red, green and blue components of a foreground scene, (b) a source of background composite video signals (129), (c) means for generating a color subcarrier frequency (14), (d) means for phase-locking the generated color subcarrier (13) to the chroma burst of the foreground composite video signal, (e) automatic means (56,57,58,59,65) for identifying the colored backing in the foreground scene, (f) automatic means (17,18,19,20,21,22,23,24,25,26,16) for phase-matching the generated color subcarrier with a foreground video subcarrier in an area of the foreground scene identified as colored backing area, (g) means for generating (88) a first control signal derived from the red, green and blue components of the foreground video signal, said first control signal being a function of the intensity of these components emanating directly from the colored backing and indirectly as a reflection resulting from backing illumination of the foreground subject, (h) means for utilizing (27,32,35,36,39,41) the first control signal for automatic level matching of the generated subcarrier with the foreground video subcarrier in an area of the foreground scene identified as the colored backing area, (i) means for subtracting (29) the phase matched and level matched generated subcarrier from the foreground scene video signal over the entire foreground scene, (j) means for generating (89) a second control signal utilizing the red, green and blue foreground component signals where said second control signal is proportional to the intensity of colored light emanating directly from the backing, but is not affected by colored light reflecting from the foreground subject, (k) means to selectively proportion (92) said first and second control signals to form a mixed control signal, (l) automatic means (91) for matching the level of said mixed control signal with the level of the luminance of the foreground video signal when in an area of the colored backing, (m) means for subtracting (94) said automatic level matched mixed control signal from the foreground video signal to remove the luminance of the colored backing, (n) means for automatically controlling (105) the level of the second control signal to match a reference level (110), (o) means for automatically controlling (109) the level of the background scene video signal by means of said level controlled second control signal, and (p) means for combining (112) the foreground scene video signal and the background scene video signal after said signals are subjected to control by said first and second control signals.

23. The apparatus of claim 22, in which; said means for combining (112) are additive.

24. The apparatus of claim 22, in which the means for generating the first control signal for a blue backing comprises;
(a) first means (4,10) to provide a difference signal, of adjustable amplitude, of the green subtracted from the red foreground video signals,
(b) second means (3,9) to provide a difference signal, of adjustable amplitude, of the red subtracted from the green foreground video signals,
(c) comparison means (5) to cause only the higher of the first and second control signals to be output from said comparison means,
(d) means (8) for increasing or decreasing the level of the blue foreground video signal, and
(e) subtractive means (2,6) which subtracts from the blue foreground video signal the green video signal and the output of said comparison means (5) to provide a first control signal for controlling the amplitude of the generated color subcarrier signal.

25. The apparatus of claim 22, in which the means for generating said second control signal comprises;
(a) first means (49) to provide the larger of the red and green foreground component signals and means (50) to adjust the amplitude of the signal provided by said first means,
(b) second means (52) to provide a difference signal of adjustable amplitude, of the blue foreground video signal subtracted from a selected d.c. voltage,
(c) subtractive means (51) that subtracts from the blue video signal the red and green video signals to form said second control signal, and
(d) limiting means (55) to prevent negative values of said second control signal.

26. The apparatus of claim 22, wherein the automatic means for identifying the colored backing in the foreground scene forms a gating pulse, comprising;
(a) means for passing (57) said second control signal when it has an amplitude above a selected level,
(b) a diode (60) connected to said means for passing,
(c) means for storing (58) a level of said second control signal that exceeds the voltage drop of said diode,
(d) means for comparing (59) the non-stored remainder of said first control signal and zero, and
(e) means for forming (57,58,59,60,61) a square wave gating pulse (65) when said first control signal remainder is within the voltage range of approximately one diode (60) voltage drop and zero.

27. The apparatus of claim 22, which additionally includes;
(a) a clock signal generator (62), and
(b) connections therefrom to said automatic means for matching signal levels (66,97,105,91).

28. The apparatus of claim 27, which additionally includes;
(a) a transmission gate (63),
(b) gating pulse means (59) connected thereto for passing clock signals from said clock signal generator to said automatic means for matching signal levels.

29. The apparatus of claim 22 wherein the effects of backing surface glare are eliminated by additional apparatus, comprising;
(a) means for comparing (97) the second control signal with the foreground blue video signal,
(b) means for utilizing the comparison (99,100) to match the level of the blue video signal to the level of the second control signal, and
(c) means for comparing (98) a portion of the matched blue video signal with the second control signal and outputting from said means for comparing (98) the smaller of the two signals compared to constitute the second control signal modified to eliminate glare and noise.

30. The apparatus of claim 22, which additionally includes clean-up means for removing unwanted subject matter, comprising;
(a) means for modifying said second control signal into a partially non-linear control signal,
(b) said means for modifying including means for producing (124,125,126,127) a clean-up signal by amplifying the modified second control signal by raising it to full intensity in areas approaching full transparency, and
(c) means for concurrently reducing the intensity of the foreground composite video signal in the same areas,
whereby semi-transparent subject matter is made fully transparent at such levels, and dust, footprints, and the like on the colored backing of the foreground scene are eliminated.

31. The apparatus of claim 22, which additionally includes;
(a) means to form (123,97,98) an alternate second control signal consisting of a red, green or blue primary video signal that represents a primary hue of the backing,
(b) means to automatically control (97,99) the level of the alternate second control signal to match the level of the second control signal in the backing,
(c) means to compare (98) a portion (101) of the alternate second control signal level with the second control signal level, and
(d) means to utilize (103,104,105) the lesser of the compared signals, to control the level of the background scene video signal.

32. A method of automatically controlling the compositing of a first encoded video signal representing a background scene, and a second encoded video signal representing a foreground scene, said foregoing scene including a foreground subject and a colored backing, said method comprising the steps of:
(a) generating a control signal $E_c$ as a function of the visibility and brightness of the colored backing;
(b) generating a gating pulse signal $E_c'$ representing a portion of the foreground scene which corresponds to a illuminated portions of the colored backing;
(c) automatically removing the chroma of the colored backing from the second encoded video signal using the gating pulse signal $E_c'$ and the control signal $E_c$;
(d) removing the luminance of the colored backing from the second encoded video signal;
(e) combining the second encoded video signal, the chroma and luminance of the colored backing having been removed therefrom, with the first encoded video signal to form a composite video image.

33. The method defined by claim 32 further comprising the steps of:

(a) generating a second control signal $E_b$ as a function of the brightness and visibility of the colored backing and a secondary illumination on the foreground subject received from the colored backing;

(b) automatically removing discoloration chroma resulting from said secondary illumination from the second encoded video signal using the gating pulse signal $E_c'$ and the second control signal $E_b$.

34. The method defined by claim 32 wherein the step of removing the luminance of the colored backed includes the steps of:

(a) comparing and automatically adjusting the level of the control signal $E_c$ to match the level of the second encoded video signal during the gating pulse;

(b) removing the luminance of the colored backing from the second encoded video signal by subtracting the adjusted level of control signal $E_c$ from the second encoded video signal.

35. The method defined by claim 33 wherein the step of removing the luminance of the colored backing includes the steps of:

(a) comparing and automatically adjusting the level of the second control signal $E_b$ to match the level of the second encoded video signal during the gating pulse;

(b) removing the luminance of the colored backing from the second encoded signal by subtracting the adjusted level of second control signal $E_b$ from the second encoded video signal.

36. The method defined by claim 33 wherein said first and second encoded video signals each include a subcarrier signal whose phase angle and amplitude represent the color content of the background and foreground scenes respectively and wherein the step of automatically removing the chroma of the colored backing includes the steps of:

(a) comparing and automatically controlling the phase angle of a generated subcarrier signal to match the phase angle of the second encoded video signal during the gating pulse;

(b) comparing and automatically controlling the amplitude of the generated subcarrier signal to match the amplitude of the second encoded video signal during the gating pulse;

(c) removing the chroma of the colored backing by subtracting the phase and amplitude matched generated subcarrier under control of the second control signal $E_b$.

37. A method of automatically controlling the compositing of a first encoded video signal representing a background scene, and a second encoded video signal representing a foreground scene, said foregoing scene including a foreground subject and a colored backing, said method comprising the steps of:

(a) generating a control signal $E_b$ as a function of the visbility and brightness of the colored backing and the secondary illumination on the foreground subject received from the colored backing;

(b) generating a gating pulse signal $E_c'$ representing a portion of the foreground scene which corresponds to a illuminated portions of the colored backing;

(c) automatically removing the chroma of the colored backing from the second encoded video signal using the gating pulse signal $E_c'$ and the control signal $E_b$;

(d) removing the luminance of the colored backing from the second encoded video signal;

(e) combining the second encoded video signal, the chroma and luminance of the colored backing having been removed therefrom, with the first encoded video signal to form a composite video image.

38. The method defined by claim 37 wherein the step of removing the luminance of the colored backing includes the steps of:

(a) comparing automatically adjusting the level of the second control signal $E_b$ to match the level of the second encoded video signal during the gating pulse;

(b) removing the luminance of the colored backing from the second encoded video signal by subtracting the adjusted level of second control signal $E_b$ from the second encoded video signal.

39. An electronic apparatus for compositing a first encoded video signal representing a background scene, and a second encoded video signal representing a foreground scene, said foreground scene including a foreground subject and a colored backing, said apparatus comprising:

(a) means for generating a control signal $E_c$ as a function of a the visibility and brightness of the colored backing;

(b) means for generating a gating pulse signal $E_c'$ which represents portions of the foreground scene corresponding to illuminated portions of the colored backing;

(c) chroma removal means coupled to said control signal generating means and said gating pulse signal generating means for automatically removing the chroma of the colored backing from the second encoded video signal;

(d) luminance removal means coupled to said control signal generating means, said gating pulse signal generating means, and said chroma removal means for removing the luminance of the colored backing from the second encoded video signal;

(e) means coupled to said luminance removal means for combining the second encoded video signal, the chroma and luminance of the colored backing having been removed therefrom, with the first encoded video signal to form a composite video image.

40. An electronic apparatus for compositing a first encoded video signal representing a background scene, and a second encoded video signal representing a foreground scene, said foreground scene including a foreground subject and a colored backing, said apparatus comprising:

(a) means for generating a control signal $E_b$ as a function of the visibility and brightness of the colored backing and a secondary illumination on the foreground subject received from the colored backing;

(b) means for generating a gating pulse signal $E_c'$ which represents portions of the foreground scene corresponding to illuminated portions of the colored backing;

(c) chroma removal means coupled to said control signal generating means and said gating pulse signal generating means for automatically removing the chroma of the colored backing from the second encoded video signal;

(d) luminance removal means coupled to said control signal generating means, said gating pulse signal generating means, and said chroma means for removing the luminance of the colored backing from the second encoded video signal;

(e) means coupled to said luminance removal means for combining the second encoded video signal, the chroma and luminance of the colored backing having been removed therefrom, with the first encoded video signal to form a composite video image.

* * * * *

UNITED STATES PATENT AND TRADEMARK OFFICE
CERTIFICATE OF CORRECTION

PATENT NO. : 4,589,013

DATED : 5/13/86

INVENTOR(S) : Vlahos et al.

It is certified that error appears in the above-identified patent and that said Letters Patent is hereby corrected as shown below:

| COLUMN | LINE | DESCRIPTION |
|--------|------|-------------|
| 16 | 59 | delete "hCue" insert --hue-- |

Signed and Sealed this

Eleventh Day of October, 1988

Attest:

DONALD J. QUIGG

*Attesting Officer*  *Commissioner of Patents and Trademarks*